(12) United States Patent
Kim et al.

(10) Patent No.: US 10,296,284 B2
(45) Date of Patent: May 21, 2019

(54) AUDIO PROCESSING DEVICE AND AUDIO PROCESSING METHOD

(71) Applicant: SAMSUNG ELECTRONICS CO., LTD., Suwon-si, Gyeonggi-do (KR)

(72) Inventors: Pyoung-yun Kim, Yongin-si (KR); Dae-hoon Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 156 days.

(21) Appl. No.: 15/423,766

(22) Filed: Feb. 3, 2017

(65) Prior Publication Data
US 2017/0228213 A1 Aug. 10, 2017

(30) Foreign Application Priority Data

Feb. 5, 2016 (KR) .................. 10-2016-0014997

(51) Int. Cl.
| | |
|---|---|
| *G06F 3/16* | (2006.01) |
| *H04N 21/43* | (2011.01) |
| *H04N 21/4363* | (2011.01) |
| *H04N 21/443* | (2011.01) |
| *H04N 21/81* | (2011.01) |
| *H04R 3/00* | (2006.01) |

(52) U.S. Cl.
CPC ......... *G06F 3/165* (2013.01); *H04N 21/4307* (2013.01); *H04N 21/43635* (2013.01); *H04N 21/4432* (2013.01); *H04N 21/8106* (2013.01); *H04R 3/00* (2013.01); *H04R 2420/03* (2013.01); *H04R 2420/09* (2013.01)

(58) Field of Classification Search
CPC ....... G06F 3/165; H04R 3/00; H04R 2420/03; H04R 2420/09
USPC .......................................................... 700/94
See application file for complete search history.

(56) References Cited

U.S. PATENT DOCUMENTS

| | | |
|---|---|---|
| 8,255,583 B2 | 8/2012 | Oh |
| 2007/0109450 A1* | 5/2007 | Lee ....................... H04W 76/10 348/730 |
| 2011/0234916 A1 | 9/2011 | Fujita et al. |
| 2014/0092314 A1 | 4/2014 | Tsinberg et al. |
| 2015/0074729 A1* | 3/2015 | Kim ................... H04N 21/4302 725/80 |
| 2015/0077633 A1 | 3/2015 | Lee et al. |

OTHER PUBLICATIONS

Extended Search Report dated Mar. 29, 2017 in counterpart European Patent Application No. 17153918.2.

* cited by examiner

*Primary Examiner* — Hemant S Patel
(74) *Attorney, Agent, or Firm* — Nixon & Vanderhye P.C.

(57) ABSTRACT

An audio processing device and an audio processing method are provided. The audio processing device includes a first controller configured to initialize the audio processing device; and a second controller configured to connect the audio processing device and an audio output device while the first controller initializes the audio processing device, and to transmit a message reporting completion of the connection of the audio processing device and the audio output device to the first controller, wherein the first controller is configured to start an operation of outputting audio to the audio output device in response to the message reporting the completion of the connection from the second controller.

19 Claims, 8 Drawing Sheets

AUDIO PROCESSING DEVICE AND AUDIO PROCESSING METHOD

CROSS-REFERENCE TO RELATED APPLICATION

This application is based on and claims priority under 35 U.S.C. § 119 to Korean Patent Application No. 10-2016-0014997, filed on Feb. 5, 2016, in the Korean Intellectual Property Office, the disclosure of which is incorporated by reference herein in its entirety.

BACKGROUND

1. Field

The present disclosure relates generally to audio processing devices and audio processing methods, and for example, to methods of quickly outputting an audio signal.

2. Description of Related Art

Home theater systems output an audio signal input as a videocassette recorder (VCR) signal or television (TV) broadcasting signal through a multichannel speaker to produce an effect of feeling at a theater. Home theater systems include a function of receiving a digital signal through a high definition multimedia interface (HDMI) audio return channel (ARC) or an optical/coaxial cable, decoding the digital signal, and outputting the decoded digital signal through a speaker. In this regard, home theater systems may output an audio signal through the ARC at a time when a main central processing unit (CPU) controlling home theater systems is completely booted and is actually capable of operating.

However, when power of home theater systems is changed from an off state to an on state, it may take a long time to initialize the main CPU and a decoder. Also, it may take a long time to receive, decode, and output the digital audio signal through the ARC or the optical/coaxial cable. Accordingly, a method of quickly outputting an audio signal through an ARC may be necessary.

SUMMARY

Additional aspects will be set forth in part in the description which follows and, in part, will be apparent from the description.

According to an aspect of an example embodiment of the present disclosure, an audio processing device includes a first controller configured to initialize the audio processing device; and a second controller configured to connect the audio processing device and an audio output device while the first controller initializes the audio processing device, and to transmit a message reporting completion of the connection of the audio processing device and the audio output device to the first controller, wherein the first controller is configured to start an operation of outputting audio to the audio output device in response to the message reporting the connection completion from the second controller.

The second controller may be configured to transmit a message for turning on the audio output device and, when the audio output device is turned on in response to the message, to connect the audio processing device and the audio output device by checking a connection state of the audio processing device and the audio output device.

The first controller may be configured to control an audio output module to start outputting audio in response to the message reporting the connection completion.

The second controller may be further configured to check the connection state of the audio processing device and the audio output device by comparing a physical address of the audio output device and an audio return channel (ARC) port of the audio processing device to determine whether the physical address and the ARC port are identical.

The second controller may be further configured to receive physical address information of the audio output device form the audio output device and compare the physical address of the audio output device and the ARC port of the audio processing device to determine, based on the physical address information, whether the physical address and the ARC port are identical.

The second controller may be further configured to store the received physical address information of the audio output device.

The second controller may be further configured to check a previously stored connection state of an ARC port when the audio processing device is turned on, and transmit a message for turning on the audio output device based on the previously stored connection state of the ARC port.

The previously stored connection state of the ARC port may include a finally stored connection state of the ARC port before the audio processing device was turned off.

The first controller may be further configured to control the second controller to store a state indicating whether the audio output device outputs an audio signal when the audio processing device is turned off.

According to an aspect of another example embodiment of the present disclosure, an audio processing method includes initializing, by a first controller, the audio processing device; connecting, by a second controller, the audio processing device and an audio output device while the first controller initializes the audio processing device, and transmitting, by a second controller, a message reporting completion of the connection of the audio processing device and the audio output device to the first controller; and starting, by the first controller, an operation of outputting audio to the audio output device in response to the message reporting the connection completion.

The connecting may include: transmitting, by the second controller, a message for turning on the audio output device; and when the audio output device is turned on in response to the message, connecting, by the second controller, the audio processing device and the audio output device by checking a connection state of the audio processing device and the audio output device.

The starting of the operation of outputting audio may include controlling, by the first controller, an audio output module to start outputting audio in response to the message reporting the connection completion.

The checking of the connection state may include comparing a physical address of the audio output device and an ARC port of the audio processing device to determine whether the physical address and the ARC port are identical.

The checking of the connection state may further include: receiving physical address information of the audio output device form the audio output device; and comparing the physical address of the audio output device and the ARC port of the audio processing device to determine whether the physical address and the ARC port are identical based on the physical address information.

The receiving may include: storing the received physical address information of the audio output device.

The audio processing method may further include: checking, by the second controller, a previously stored connection state of an ARC port when the audio processing device is turned on; and transmitting, by the second controller, a message for turning on the audio output device based on the previously stored connection state of the ARC port.

The previously stored connection state of the ARC port may include a finally stored connection state of the ARC port before the audio processing device was turned off.

The audio processing method may further include: controlling, by the first controller, the second controller to store a state indicating whether the audio

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects.

The terms used in the present disclosure are selected from among common terms that are currently widely used in consideration of their function in the present disclosure. However, the terms may be different according to an intention of one of ordinary skill in the art, a precedent, or the advent of new technology. Therefore, the terms used in the present disclosure are not merely designations of the terms, but the terms are defined based on the meaning of the terms and content throughout the present disclosure.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. Throughout the disclosure, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Throughout the disclosure, in particular, in claims, "the" or other similar referring expressions may refer to both a singular form and a plural form. Also, if there is no description explicitly referring to orders of operations included in methods according to the present disclosure, the operations may be performed in an appropriate order. The present disclosure is not limited to the described orders of operations.

Expressions such as "in some embodiments" and "according to an embodiment" described in various parts of this disclosure do not necessarily refer to the same embodiments.

The present disclosure may be described in terms of functional block components and various processing steps. Some or all of such functional blocks may be realized by any number of hardware and/or software components configured to perform the specified functions. For example, the functional blocks of the present disclosure may be realized by one or more microprocessors or by circuit components configured to perform certain functions. Also, the functional blocks of the present disclosure may be realized by various programming or scripting languages. The functional blocks may be implemented in algorithms that execute on one or more processors. Furthermore, the present disclosure could employ any number of conventional techniques for electronics configuration, signal processing and/or control, data processing and the like. The words "mechanism," "element," "device," and "component" are used broadly and are not limited to mechanical or physical embodiments.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

Hereinafter, the present disclosure will be described in greater detail with reference to the accompanying drawings.

Figure 1:
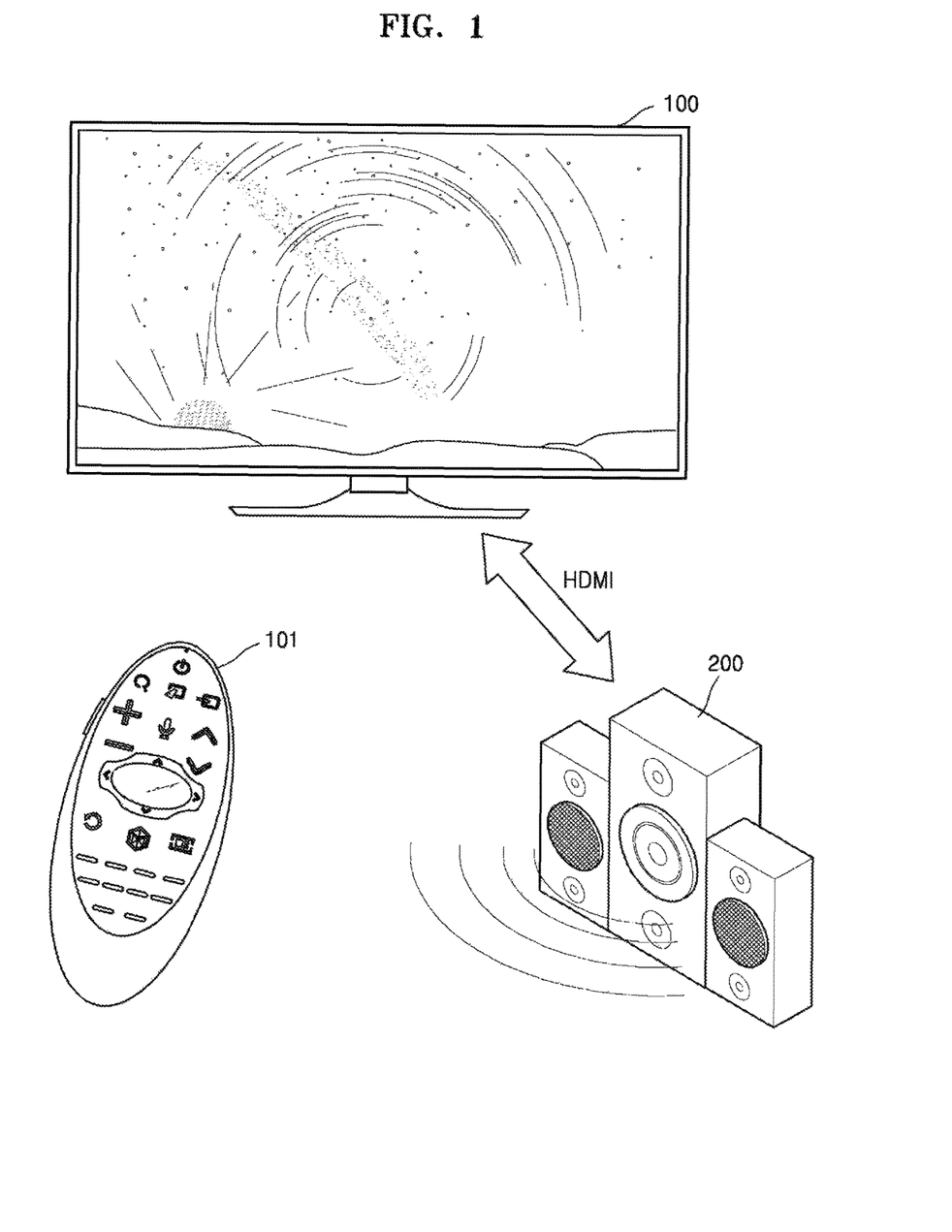
FIG. 1 is a diagram illustrating an example audio processing device configured to apply an audio processing method, according to an example embodiment.

FIG. 1 is a diagram illustrating an example audio processing device 100 configured to apply an audio processing method, according to an example embodiment.

The audio processing device 100 may include all of an audio listening device and an electronic device including a display such as a television (TV), a laptop, and a cellular phone, or the like, but is not limited thereto. For example, the audio processing device 100 may include various electronic devices, such as cellular phones, tablet personal computers (PCs), digital cameras, camcorders, laptop computers, desktop computers, electronic book terminals, digital broadcasting terminals, personal digital assistants (PDAs), portable multimedia players (PMPs), navigation devices, MP3 players, wearable devices, or the like, but is not limited thereto. In addition, the audio processing device 100 may be a stationary or mobile device, and may be a digital broadcasting receiver configured to receive digital broadcasting. Also, the audio processing device 100 may be a component of an electronic device including a display, according to an embodiment.

A controller 101 may include various types of devices configured to control the audio processing device 100, such as a remote controller or a cellular phone.

Alternatively, when the audio processing device 100 includes a display that is configured as a touch screen, the controller 101 may be replaced with a user's finger or an input pen, etc.

Also, the controller 101 may control the audio processing device 100 using short-range communication, such as infrared communication or Bluetooth communication. The controller 101 may control functions of the audio processing device 100 by using at least one of a provided key (including a button), a touchpad, a microphone (not shown) configured to receive a user's voice, and a sensor (not shown) configured to recognize motion of the controller 101

The controller 101 may include a power on/off button for turning on/off the audio processing device 100. Also, based on a user input, the controller 101 may shift a channel, adjust a volume of sound, select ground wave/cable/satellite broadcasting, and set an environment, with respect to the audio processing device 100.

Also, the controller 101 may include a pointing device. For example, the controller 101 may operate as the pointing device, when receiving a certain key input.

In the embodiment of the present disclosure, the term "user" may refer, for example, to a human being who controls a function or an operation of the audio processing device 100 by using the controller 101 and may include a viewer, a manager, or an installation engineer.

When the audio processing device 100 provides a high definition multimedia interface (HDMI) port, as illustrated in FIG. 1, the audio processing device 100 may be connected to an audio output device 200 through the HDMI port. In this regard, the audio output device 200 may include a receiver, a sound bar, or one or more speakers but is not limited thereto.

The audio processing device 100 may easily control peripheral devices (for example, the audio output device 200) connected to the audio processing device 100 by using a HDMI consumer electronics control (CEC) function. For example, since a user input to turn on the audio processing device 100 is received from the controller 101, the audio processing device 100 may control the audio output device 200 connected thereto to be turned on/off.

Also, the audio processing device 100 may control the audio output device 200 to output an audio return channel (ARC) audio signal by using a HDMI ARC function. In this regard, when the audio processing device 100 is turned on, an operation of setting an ARC mode may be necessary.

An ARC function is added from version 1.4 of the HDMI specification to transmit an audio signal from the audio processing device 100 (e.g. a TV) to the audio output device 200 (e.g. a sound bar and an A/V receiver) by using one HDMI cable. Accordingly, the audio processing device 100 such as the TV may receive an image signal by using one HDMI cable and transmit the audio signal to the audio output device 200. The ARC mode may refer, for example, to a mode in which an ARC audio signal is output from the audio output device 200 by using the ARC function.

The audio processing device 100 and the audio output device 200 may transmit and receive a message for setting the ARC mode.

For example, the message for setting the ARC mode may include a message requesting a physical address of the audio output device 200, a message transferring the physical address in response to the message requesting the physical address, a message requesting connection of an ARC port, a message permitting the connection of the ARC port in response to the message requesting the connection of the ARC port, and a message reporting completion of the connection of the ARC port, but is not limited thereto. For convenience of description, the message for setting the ARC mode is referred to as an ARC message below.

To set the ARC mode, a process for the audio processing device 100 to process the ARC message may be necessary. The more quickly the ARC message is processed, the more quickly the audio output device 200 outputs an ARC audio signal. Accordingly, a method for the audio processing device 100 to quickly process the ARC message may be required.

Figure 2:
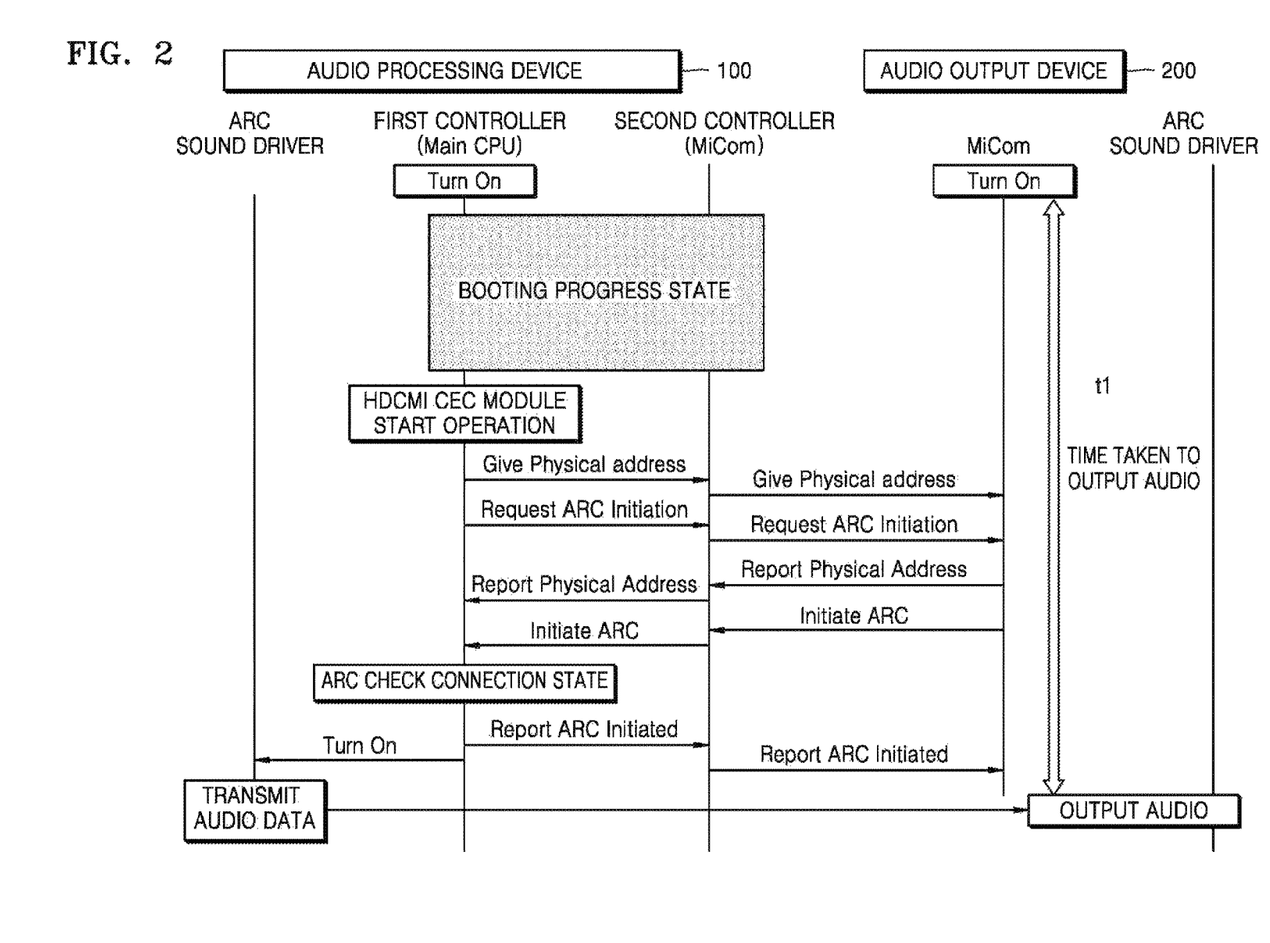
FIG. 2 is a flowchart illustrating an example process of connecting an audio processing device and an audio output device performed by a first controller, according to an example embodiment.

FIG. 2 is a flowchart illustrating an example process of processing an ARC message performed by the audio processing device 100.

The audio processing device 100 may include a first controller, a second controller, and an audio output module.

The first controller may include a main central processing unit (CPU) module of the audio processing device 100. The main CPU module may control general operations of components of the audio processing device 100. The second controller may include a MiCom module of the audio processing device 100. The MiCom module may manage power states of the components of the audio processing device 100 and physical addresses of external devices connected to the audio processing device 100. An audio output module may include an ARC sound driver. The ARC sound driver may output an ARC audio signal to the audio output device 200. The audio output module may be controlled by the first controller.

The ARC message may be processed by the first controller of the audio processing device 100. However, when the audio processing device 100 is changed from an off state to an on state, the first controller may need to initialize the audio processing device 100. Accordingly, until the audio processing device 100 is completely initialized from the audio processing device 100 is in the on state, it may be difficult for the first controller to process the ARC message. Since the ARC message may be processed after the audio processing device 100 is completely initialized, when the audio processing device 100 is in the on state, time taken to process the ARC message may increase. Thus, before the ARC message is processed and connection operation of the ARC port is complete, an audio signal may be output from the audio output device 100. After the connection operation of the ARC port is complete, the audio signal may be output from the audio output device 200.

If the audio processing device 100 is in the on state, the first controller may initialize the audio processing device 100. As described above, after the audio processing device 100 is completely initialized, the first controller may process the ARC message.

If the audio processing device 100 is completely initialized, the first controller may transmit a message requesting a physical address of the audio output device 200 to the audio output device 200 through the second controller. For example, as shown in FIG. 2, the message requesting the physical address of the audio output device 200 may be presented as "Give Physical address" but is not limited thereto.

The physical address of the audio output device 200 may be information about an HDMI port to which the audio output device 200 is connected among a plurality of HDMI ports provided by the audio processing device 100. For example, the audio processing device 100 may include four HDMI ports, and the audio output device 200 may be connected to a second HDMI port. In this regard, the physical address of the audio output device 200 may be information indicating a number of the second HDMI port.

The first controller may transmit a message requesting connection of an ARC port to the audio output device 200 through the second controller. For example, as shown in FIG. 2, the message requesting the connection of the ARC port may be presented as "Request ARC Initiation" but is not limited thereto.

The audio output device 200 may transmit the physical address of the audio output device 200 to the first controller in response to the message requesting the physical address. For example, as shown in FIG. 2, a message transmitting the physical address to the first controller may be presented as "Report Physical address" but is not limited thereto.

Also, the audio output device 200 may transmit a message permitting the connection of the ARC port to the first controller in response to the message requesting the connection of the ARC port. For example, the message requesting the connection of the ARC port may be presented as "Initiate ARC" but is not limited thereto.

The first controller may compare the received physical address of the audio output device 200 and an ARC port number of the audio processing device 100 to determine whether the received physical address and the ARC port number are identical. When the audio processing device 100 provides the plurality of HDMI ports, at least one of the plurality of HDMI ports may be an ARC port. In this regard, the first controller may check the HDMI port to which the audio output device 200 is connected, and thus a connection state of the ARC port may be checked.

If the HDMI port to which the audio output device 200 is connected is the ARC port, the first controller may transmit a message reporting completion of the connection of the ARC port to the audio output device 200. For example, as shown in FIG. 2, the message reporting the connection completion of the ARC port may be presented as "Report ARC initiated" but is not limited thereto.

If connection of the ARC port is complete, the first controller may control an audio output module included in the audio processing device 100 to output an audio signal to the audio output device 200. In this regard, the audio output module may include an ARC sound driver but is not limited thereto. For example, the first controller may transmit a message for turning on the audio output module to the audio output module. The audio output module may be turned on in response to the message transmitted from the first controller and may transmit the audio signal to the audio output device 200.

As illustrated in FIG. 2, while the audio processing device 100 is initialized, the first controller may not process the ARC message. After the audio processing device 100 is initialized, the first controller may process the ARC message. Accordingly, the audio output device 200 may delay outputting the audio signal.

Figure 3:
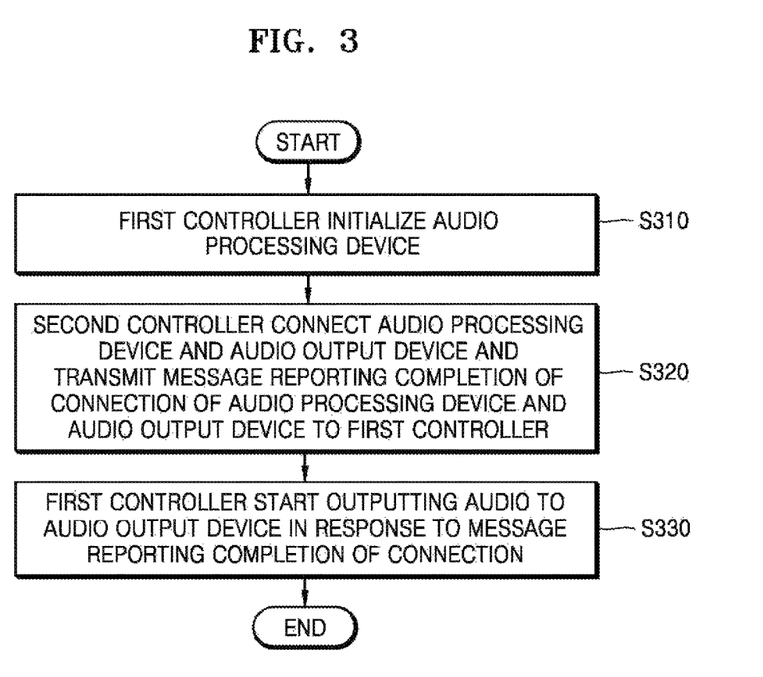
FIG. 3 is a flowchart illustrating an example audio processing method, according to an example embodiment.

FIG. 3 is a flowchart illustrating an example audio processing method, according to an embodiment.

In operation S310, a first controller may initialize the audio processing device 100. Operation S310 of initializing the audio processing device 100 may include an operation of processing each of detailed modules constituting the audio processing device 100 to operate. For example, operation S310 of initializing the audio processing device 100 may include an operation of processing a HDMI CEC module included in the audio processing device 100 to start operating but is not limited thereto.

While the first controller initializes the audio processing device 100, in operation S320, a second controller may connect the audio processing device 100 and the audio output device 200. The second controller may transmit a message indicating completion of the connection of the audio processing device 100 and the audio output device 200 to the first controller.

Operation S320 of connecting the audio processing device 100 and the audio output device 200 may be an operation of setting an ARC mode. As described above, the ARC mode may be a mode in which the audio output device 200 is connected to an ARC port of the audio processing device 100 and outputs an ARC audio signal. For example, if the audio output device 200 is connected to the ARC port of the audio processing device 100, the audio processing device 100 may control the audio output device 200 to output the ARC audio signal.

If a predetermined power is supplied to the audio processing device 100, even before the audio processing device 100 is initialized, the second controller may operate. The second controller may control a standby state of the audio processing device 100. If a user input to turn on the audio processing device 100 is received in the standby state, the second controller may control the first controller to receive a power supply. Thus, if the audio processing device 100 is in an on state, without having to wait for completion of the initialization of the audio processing device 100, the second controller may connect the audio processing device 100 and the audio output device 200.

The second controller may transmit a message indicating completion of the connection of the audio processing device 100 and the audio output device 200 to the first controller after connecting the audio processing device 100 and the audio output device 200. The first controller may be informed of completion of the connection of the audio processing device 100 and the audio output device 200 by receiving the message indicating the connection completion from the second controller. Operation S320 of connecting the audio processing device 100 and the audio output device 200 performed by the second controller will be described in greater detail below with reference to FIG. 4 below.

In operation S330, the first controller may start outputting audio to the audio output device 200 in response to the message indicating the connection completion.

The first controller may control an audio output module included in the audio processing device 100 to start outputting audio to the audio output device 200 in response to the message indicating the connection completion. In this regard, the audio output module may include an ARC sound driver but is not limited thereto.

For example, the first controller may transmit a message for turning on the audio output module to the audio output module. If the audio output module is turned on in response to the message received from the first controller, the audio output module may transmit an audio signal to the audio output device 200.

Figure 4:
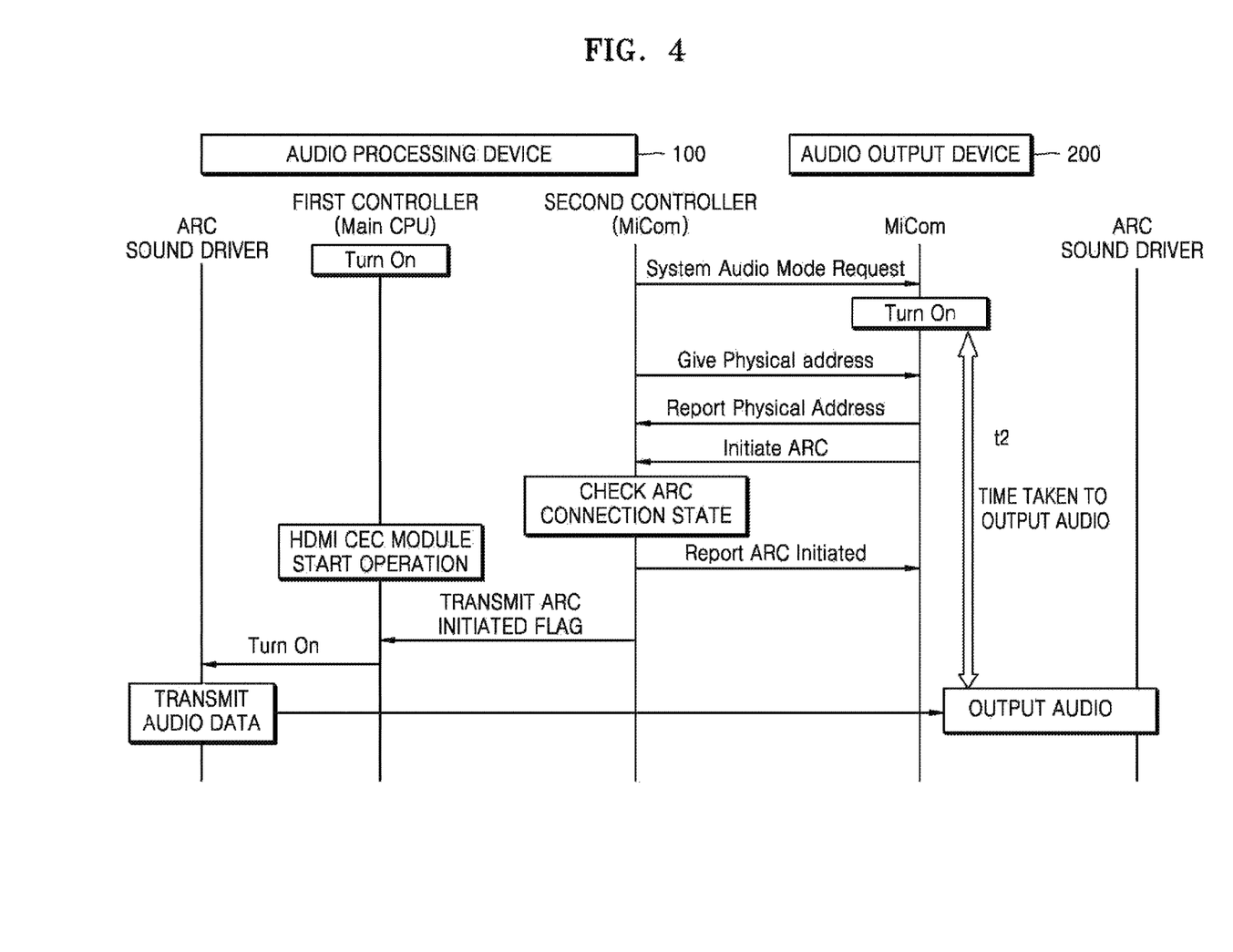
FIG. 4 is a flowchart illustrating an example operation of connecting an audio processing device and an audio output device performed by a second controller, according to an example embodiment.

FIG. 4 is a flowchart illustrating an example operation of connecting the audio processing device 100 and the audio output device 200 performed by a second controller, according to an example embodiment.

If the audio processing device 100 is turned on, the second controller may transmit a message for turning on the audio output device 200.

For example, if a user input to turn on the audio processing device 100 is received from the controller 101, the second controller may transmit the message for turning on the audio output device 200. For example, as illustrated in FIG. 4, the message for turning on the audio output device 200 may be presented as "System Audio Mode Request" but is not limited thereto.

The audio output device 200 may be in an on state in response to the received message. Accordingly, on/off states of the audio processing device 100 and the audio output device 200 may be controlled by the one controller 101 (e.g., a remote controller).

Also, if the audio processing device 100 is turned on, the first controller may initialize detailed modules necessary for operating the audio processing device 100. While the modules are initialized by the first controller, the second controller may connect the audio processing device 100 and the audio output device 200.

The operation of connecting the audio processing device 100 and the audio output device 200 performed by the second controller will be described in detail below. As described above, the operation of connecting the audio processing device 100 and the audio output device 200 may include an operation of setting an ARC mode.

Referring to FIG. 4, the second controller may transmit a message (for example, "Give Physical address") requesting a physical address of the audio output device 200 to the audio output device 200.

When the audio output device 200 is connected to an ARC port of the audio processing device 100, the audio output device 200 may output an ARC audio signal. Thus, the audio processing device 100 may need to check if the audio output device 200 is connected to the ARC port. However, according to an embodiment, if the audio output device 200 is connected to the ARC port, the audio output device 200 may transmit the physical address thereof. In this regard, the audio processing device 100 may use the physical address of the audio output device 200 without having to check if the audio output device 200 is connected to the ARC port.

The audio output device 200 may transmit the physical address thereof to the second controller in response to the message requesting the physical address.

For example, the physical address may have a size of 4 bytes. The audio processing device 100 may include four HDMI ports. The ARC port may be a second HDMI port among the four HDMI ports. In this regard, when the audio output device 200 is connected to the ARC port, the physical address of the audio output device 200 may be presented as "2.0.0.0" but is not limited thereto.

The audio output device 200 may transmit a message permitting connection of the ARC port to the second controller. For example, as shown in FIG. 4, the message permitting the connection of the ARC port may be presented as "Initiate ARC" but is not limited thereto.

The second controller may compare the physical address of the audio output device 200 and an ARC port number of the audio processing device 100. The second controller may check if the ARC port is in a connection state by comparing the physical address of the audio output device 200 and the ARC port number of the audio processing device 100 to determine whether the physical address and the ARC port number are identical.

If the ARC port is in the connection state, the second controller may transmit a message reporting completion of the connection of the ARC port to the audio output device 200. For example, as shown in FIG. 4, the message reporting the connection completion of the ARC port may be presented as "Report ARC initiated" but is not limited thereto.

The second controller may transmit the message reporting the connection completion of the ARC port to the first controller. In this regard, the first controller may receive the message after completely initializing the audio processing device 100.

If connection of the ARC port is complete, the first controller may control an audio output module included in the audio processing device 100 to output an ARC audio signal to the audio output device 200. For example, the first controller may transmit a message for turning on the audio output module to the audio output module. In this regard, the audio output module may be an ARC sound bar but is not limited thereto.

If the message is received from the first controller, the audio output module may transmit the ARC audio signal to the audio output device 200. Accordingly, the audio output device 200 may output the ARC audio signal.

Figure 5:
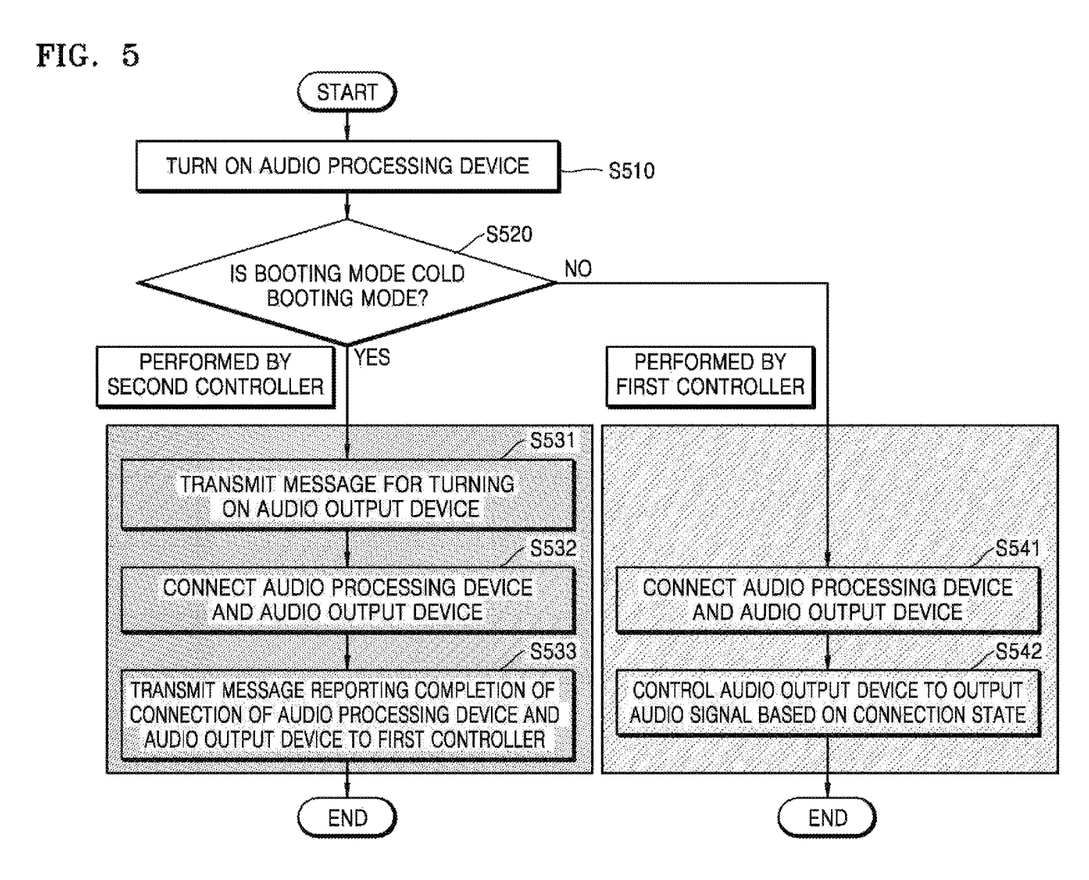
FIG. 5 is a flowchart illustrating an example audio processing method according to a booting mode.

FIG. 5 is a flowchart illustrating an example method of differently setting an ARC mode according to a booting mode.

The booting mode of the audio processing device 100 may include a cold booting mode and an instant booting mode but is not limited thereto.

The cold booting mode may include a case where AC power is detached. In the cold booting mode, since the audio processing device 100 is completely changed from an off state to an on state, a first controller needs to initialize the audio processing device 100.

However, in the instant booting mode, the first controller may be in a state in which the audio processing device 100 is completely initialized. For example, in case of the audio processing device 100 including a display, both the first controller and a second controller are in an operable state while only the display is in an off state. In this regard, in the instant booting mode, the audio processing device 100 may change the off state of the display to an on state. Also, the audio processing device 100 may store a final state of an operation that is being performed before being turned off. If the audio processing device 100 is turned on in the instant booting mode, the audio processing device 100 may perform the operation based on the stored final state.

In the cold booting mode, the audio processing device 100 may also perform the operation again based on the stored final state. However, an initialization process of the audio processing device 100 is necessary in the cold booting mode, which may cause an increase of time.

When the initialization process of the audio processing device 100 is unnecessary, in general, the first controller may more quickly connect the audio processing device 100 and the audio output device 200 than the second controller. In the instant booting mode, since it is unnecessary to wait for the initialization process of the audio processing device 100, the first controller may quickly connect the audio processing device 100 and the audio output device 200.

Thus, according to the booting mode of the audio processing device 100, the audio processing device 100 may differently set a subject that performs an operation of connecting the audio processing device 100 and the audio output device 200.

Referring to FIG. 5, if the audio processing device 100 is turned on (operation S510), the audio processing device 100 may determine whether the booting mode is the cold booting mode (operation S520). If the booting mode is the cold booting mode, as described above, the first controller may initialize the audio processing device 100. Thus, it may be difficult for the first controller to directly connect the audio processing device 100 and the audio output device 200. In this regard, the second controller may connect the audio processing device 100 and the audio output device 200, thereby reducing time taken for the audio output device 200 to output an audio signal.

For example, since the audio processing device 100 is turned on, the second controller may transmit a message for turning on the audio output device 200 (operation S531). Accordingly, if a user input to turn on the audio processing device 10 is received from the controller 101, both the audio processing device 100 and the audio output device 200 may be turned on.

The second controller may connect the audio processing device 100 and the audio output device 200 (operation S532). If connection of the audio processing device 100 and the audio output device 200 is complete, the second controller may transmit a message reporting completion of the connection to the first controller (operation S533). As the message reporting the connection completion is transmitted, the first controller may know that an ARC mode is set. The first controller may control an audio output module to start outputting audio.

In the instant booting mode (e.g., "no" of operation S520), the first controller may directly connect the audio processing device 100 and the audio output device 200 (operation S541). Since a processing speed of the first controller is faster than a processing speed of the second controller, the first controller may more quickly connect the audio processing device 100 and the audio output device 200 than the second controller. If the first controller connects the audio processing device 100 and the audio output device 200, an operation of transmitting the message reporting the connection completion to the first controller may be unnecessary. Thus, if the audio processing device 100 and the audio output device 200 are completely connected, the first controller may control the audio output module to start outputting audio (operation S542).

As described above, an audio processing method according to an embodiment may differently set a subject that connects the audio processing device 100 and the audio output device 200 according to the booting mode of the audio processing device 100. Accordingly, the audio processing method according to an embodiment may reduce time taken for the audio output device 200 to output the audio signal.

Figure 6:
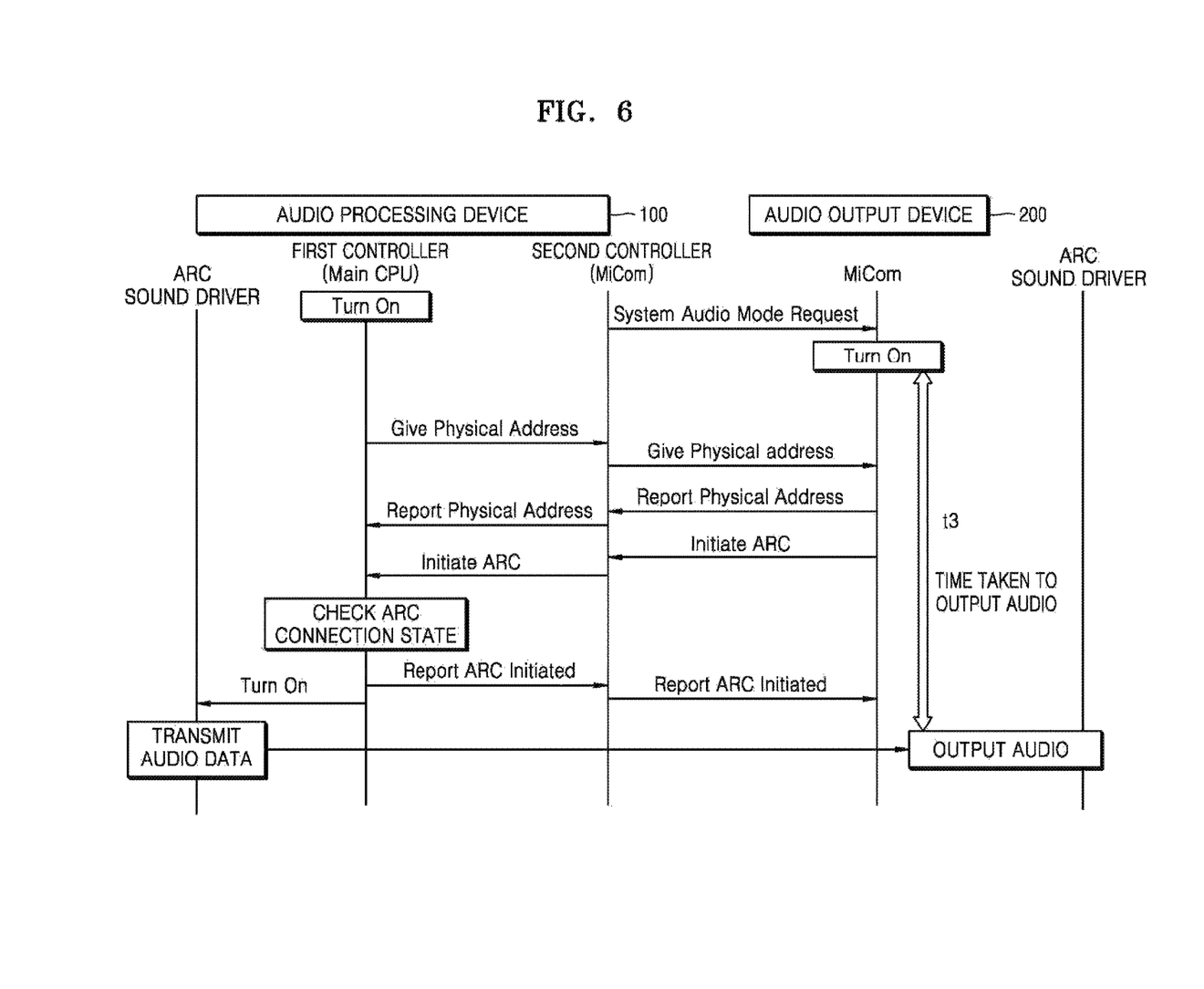
FIG. 6 is a flowchart illustrating an example process of connecting an audio processing device and an audio output device performed by a first controller in an instant booting mode.

FIG. 6 is a flowchart illustrating an example process of connecting the audio processing device 100 and the audio output device 200 performed by a first controller in an instant booting mode.

In the instant booting mode, if the audio processing device 100 is in an on state, the first controller may not initialize the audio processing device 100. Thus, the first controller may more quickly connect the audio processing device 100 and the audio output device 200.

In the audio processing method of FIGS. 2, 4, and 6, time taken to output an audio signal after the audio processing device 100 is in the on state are respectively denoted by t1, t2, and t3. t2 and t3 may be less than t1. In the instant booting mode, the first controller may not need to initialize the audio processing device 100, and the first controller with a faster processing speed than a second controller may connect the audio processing device 100 and the audio output device 200, and thus t3 may be less than t2. However, a case where t3 is less than t2 may be limited to the instant booting mode in which an initialization process is unnecessary. In the instant booting mode in which the initialization process is unnecessary, since the processing speed of the first controller is faster than a processing speed of the second controller, t3 may be less than t2.

Figure 7:
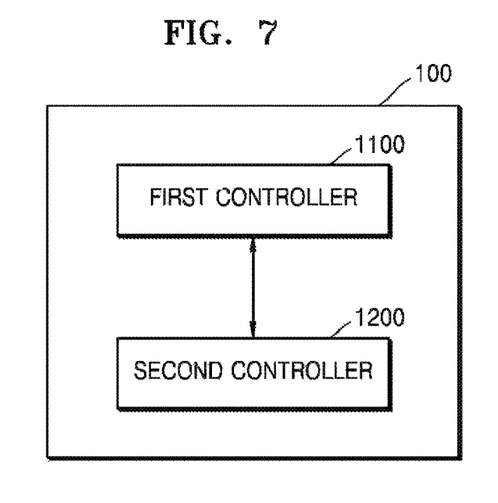
FIG. 7 is a block diagram illustrating an example configuration of an audio processing device according to an example embodiment.

FIG. 7 is a block diagram illustrating an example configuration of the audio processing device 100 according to an example embodiment.

Referring to FIG. 7, the audio processing device 100 may include a first controller 1100 and a second controller 1200.

However, not all illustrated components are essential components. The audio processing device 100 may include more or less components than those illustrated in FIG. 7.

Hereinafter, the components will be sequentially described.

The first controller 1100 may initialize the audio processing device 100. If the second controller 1200 completely connects the audio processing device 100 and the audio output device 200, the first controller 1100 may start outputting audio to the audio output device 200. Also, the first controller 1100 may control general operations of the audio processing device 100.

The second controller 1200 may connect the audio processing device 100 and the audio output device 200 while the first controller 1100 initializes the audio processing device 100. The second controller 1200 may transmit a message reporting completion of the connection of the audio processing device 100 and the audio output device 200 to the first controller 1100.

Also, the second controller 1200 may check a previously stored connection state of an ARC port when the audio processing device 100 is turned on. In this regard, the previously stored connection state of the ARC port may refer, for example, to a finally stored connection state of the ARC port before the audio processing device 100 was turned off. For example, if the audio processing device 100 has operated in an ARC mode, the audio processing device 100 may store the connection state of the ARC port as "On" before being turned off.

If the previously stored connection state of the ARC port is "On", when the audio processing device 100 is turned on, the second controller 1200 may transmit a message for turning on the audio output device 200 to the audio output device 200.

If the previously stored connection state of the ARC port is "Off", the previously stored connection state of the ARC port indicates that the audio output device 200 had not output an audio signal before the audio processing device 100 was turned off. For example, before the audio processing device 100 was turned off, the audio processing device 100 may have output the audio signal. Thus, if the previously stored connection state of the ARC port is "Off", when the audio processing device 100 is turned on, the second controller 1200 may not transmit the message for turning on the audio output device 200 to the audio output device 200.

Accordingly, the audio processing device 100 may control the audio processing device 100 and the audio output device 200 to be turned on/off in consideration of an audio outputting method used before the audio processing device 100 is turned off.

The second controller 1200 may compare a physical address of the audio output device 200 and an ARC port number of the audio processing device 100 to determine whether the physical address and the ARC port number are identical, thereby checking a connection state of the audio processing device 100 and the audio output device 200. As described above, the connection state of the audio processing device 100 and the audio output device 200 may refer, for example, to a connection state of the ARC port.

The second controller 1200 may receive and store the physical address of the audio output device 200 from the audio output device 200. The second controller 1200 may use the stored physical address to check the connection state of the audio processing device 100 and the audio output device 200.

Figure 8:
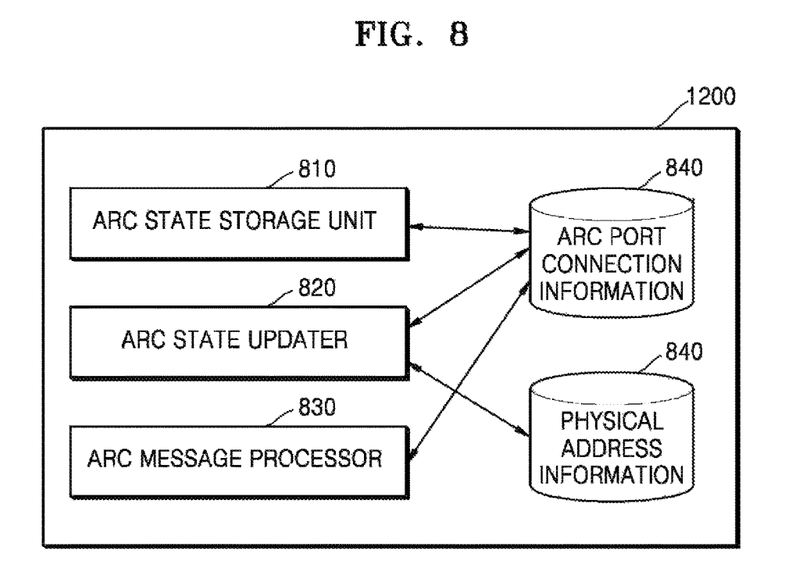
FIG. 8 is a block diagram illustrating an example configuration of a second controller according to an embodiment.

FIG. 8 is a block diagram illustrating an example configuration of the second controller 1200 according to an example embodiment.

According to an embodiment, the second controller 1200 may include an ARC state storage unit 810, an ARC state updater 820, an ARC message processor 830, and a memory 840 storing ARC port connection information and physical address information, as illustrated in FIG. 8. In this regard, the ARC port connection information and the physical address information may be stored in different memories or in one memory.

However, not all illustrated components are essential components. The second controller 1200 may include more or less components than those illustrated in FIG. 8.

The ARC state storage unit 810 may store a connection state of an ARC port. For example, when the audio output device 200 is connected to the ARC port, the connection state of the ARC port may be a state in which the audio output device 200 outputs an ARC audio signal.

The ARC state storage unit 810 may store the connection state of the ARC port when the audio output device 200 is connected to the ARC port and outputs the ARC audio signal. Also, the ARC state storage unit 810 may store the connection state of the ARC port before the audio processing device 100 is turned off.

The ARC state updater 820 may transmit a message for turning on the audio output device 200 to the audio output device 200 based on a finally stored connection state of the ARC port before the audio processing device 100 was turned off.

For example, when the finally stored connection state of the ARC port before the audio processing device 100 was turned off is "On", the ARC state updater 820 may transmit the message for turning on the audio processing device 100 to the audio output device 200. If the finally stored connection state of the ARC port before the audio processing device 100 was turned off is "Off", the ARC state updater 820 may not transmit the message for turning on the audio output device 200 to the audio output device 200.

Also, when the audio processing device 100 is turned on, the ARC state updater 820 may check if a physical address of the audio output device 200 and an ARC port number of the audio processing device 100 are identical, thereby updating the connection state of the ARC port.

For example, if the physical address of the audio output device 200 and the ARC port number of the audio processing device 100 are identical, the ARC state updater 820 may update the connection state of the ARC port as "On". If the physical address of the audio output device 200 and the ARC port number of the audio processing device 100 are not identical, the ARC state updater 820 may update the connection state of the ARC port as "Off".

The ARC message processor 830 may transmit a message requesting connection of the ARC port to the audio output device 200.

The ARC message processor 830 may transmit a message reporting completion of the connection of the ARC port to the audio output device 200 in response to the message received from the audio output device 200.

Figure 9:
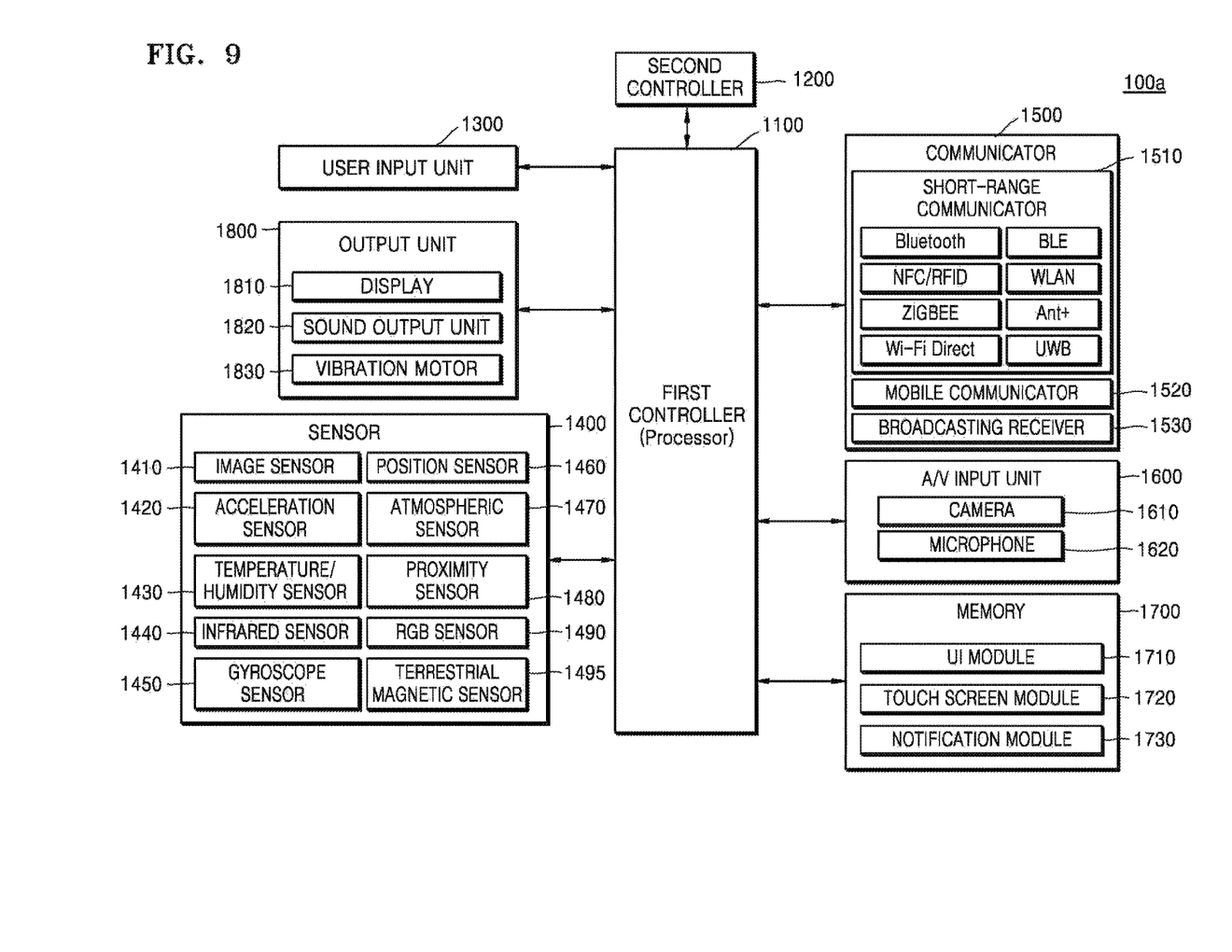
FIG. 9 is a block diagram illustrating an example configuration of an audio processing device according to another example embodiment.

FIG. 9 is a block diagram illustrating an example configuration of an audio processing device 100a according to another example embodiment.

As illustrated in FIG. 9, the audio processing device 100a may further include a user input unit (e.g., including input circuitry) 1300, a sensor 1400, a communicator (e.g., including communication circuitry) 1500, an audio/video (NV) input unit (e.g., including AN input circuitry) 1600, a memory 1700, and an output unit (e.g., including output circuitry) 1800, in addition to the first controller (e.g., including processing circuitry) 1100 and the second controller (e.g., including processing circuitry) 1200.

With respect to the first controller 1100 and the second controller 1200, the same descriptions as those described with reference to FIG. 7 will not be repeated.

The user input unit 1300 may include various circuitry for a user to input data to control the audio processing device 100a. The user input unit 1300 may be a user input to turn on the audio processing device 100a.

For example, the user input unit 1300 may include various circuitry, such as, for example, and without limitation, a key pad or a dome switch, the user input to turn on the audio processing device 100a may be an input of clicking or pressing a key corresponding to a power on/off. Alternatively, when the user input unit 1300 includes input circuitry such as a touch pad, the user input may be an input of touching a key corresponding to a specific direction. However, the user input is not limited to the examples.

Also, the user input unit 1300 may be included in the controller 101 described above or in the audio processing device 100a.

The output unit 1800 may include various output circuitry, such as, for example, and without limitation, a sound output unit 1820 and a vibration motor 1830, in addition to a display 1810.

The sound output unit 1820 may include various circuitry configured to output audio data received from the communicator 1500 or stored in the memory 1700. Also, the sound output unit 1820 may output sound signals (for example, a call signal reception sound, a message reception sound, and an alarm sound) related to functions performed in the audio processing device 100a. The sound output unit 1820 may include various circuitry, such as, for example, and without limitation, an audio output module of the audio processing device 100a. Accordingly, the sound output unit 1820 may control the audio output device 200 to output an ARC audio signal. The sound output unit 1820 may include a speaker, a buzzer, or the like.

The vibration motor 1830 may output a vibration signal. For example, the vibration motor 1830 may output the vibration signal corresponding to an output of audio data or video data (for example, the call signal reception signal, the message reception signal, etc.). Also, the vibration motor 1830 may output the vibration signal when a touch is input in a touch screen.

The sensor 1400 may sense a state of the audio processing device 100a or a state of a surrounding environment of the audio processing device 100a and transmit the sensed information to the first controller 1100.

The communicator 1500 may include various communication circuitry including one or more components for communication between the audio processing device 100a and an external device. For example, the communicator 1500 may include various communication circuitry, such as, for example, and without limitation, a short-range wireless communicator 1510, a mobile communicator 1520, and a broadcasting receiving unit 1530.

The short-range wireless communicator 1510 may include a Bluetooth communicator, a Bluetooth low energy (BLE) communicator, a near-field communicator, a WLAN (Wi-Fi) communicator, a Zigbee communicator, an infrared data association (IrDA) communicator, a Wi-Fi direct (WFD) communicator, an ultra wideband (UWB) communicator, and an Ant+ communicator. However, the short-range wireless communicator 151 is not limited thereto.

The mobile communicator 1520 exchanges wireless signals with at least one selected from a base station in a mobile communication network, an external terminal, and a server. Here, the wireless signals may include sound call signals, internet protocol video call signals, or various types of data according to exchanging of text/multimedia messages.

The broadcasting receiver 1530 receives broadcasting signals from the outside via broadcasting channels and/or information related to broadcasting. The broadcasting channels may include satellite channels and ground wave channels. According to embodiments, the audio processing device 100a may not include the broadcasting receiver 1530.

The A/V input unit 1600 may include various circuitry configured to input audio signals or video signals, and may include circuitry, such as, for example, and without limitation, a camera 1610 and a microphone 1620.

The camera 1610 may obtain an image frame, such as a still image or a video, via an image sensor, in an internet protocol video mode or a photographing mode. The image captured via the image sensor may be processed via the first controller 1100 or an additional image processing unit (not shown).

The microphone 1620 receives an input of an external sound signal and processes the external sound signal as electrical sound data. For example, the microphone 1620 may receive sound signals from an external device or a speaker.

The memory 1700 may store programs for processing and controlling the first controller 1100, and may store data that is input in the audio processing device 100a or output from the audio processing device 100a.

The memory 1700 may include at least one type of storage medium selected from a flash memory type, a hard disk type, a multimedia card micro type, a card type memory (for example, SD or XD memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk.

According to an embodiment, the memory 1700 may include a module including one or more instructions to allow the first controller 1100 to initialize the audio processing device 100a, to allow the second controller 1200 to connect the audio processing device 100a and the audio output device 200 while the first controller 1100 initializes the audio processing device 100a, to allow the second controller 1200 to transmit a message reporting completion of the connection of the audio processing device 100a and the audio output device 200 to the first controller 1100, and to allow the first controller 1100 to start an operation of outputting audio to the audio output device 200 in response to the message reporting the connection completion.

Programs stored in the memory 1700 may be divided into a plurality of modules according to their functions. For example, the programs may be divided into a user interface (UI) module 1710, a touch screen module (1720), a notification module 1730, etc.

The UI module 1710 may provide a specialized UI connected with the audio processing device 100a, for example, a graphic user interface (GUI), according to applications. The touch screen module 1720 may sense a touch gesture of a user on a touch screen, and may transmit information about the touch gesture to the first controller 1100. The touch screen module 1720 may recognize and analyze a touch code. The touch screen module 1720 may be formed as separate hardware including a controller.

The notification module 1730 may generate a signal notifying an occurrence of an event of the audio processing device 100a. Examples of the event generated in the audio processing device 100a may include a call signal reception, a message reception, a key signal reception, a schedule notification, etc. The notification module 1730 may output a notification signal in a video signal form through the display 1810, in an audio signal form through the sound output unit 1820, and in a vibration signal form through the vibration motor 1830.

FIGS. 7 and 9 are example block diagrams of the image display devices 100 and 100a according to various example embodiments. Components of each block diagram may be combined, added, or omitted, according to specifications of the image display devices 100 and 100a that are actually realized. That is, more than two components may be combined into one component, or one component may be divided into two components, according to necessity. Also, the functions performed in each block diagram are for describing the embodiments, and specific operations or devices of each block diagram do not limit the scope of the present disclosure.

The method of the present disclosure may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the disclosure or may be known to and usable by one of ordinary skill in a field of computer software. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that various example embodiments described herein should be considered in a descriptive sense only and not for purposes of limitation. Descriptions of features or aspects within each embodiment should typically be considered as available for other similar features or aspects in other embodiments. Components that are integrally described may be executed in a distributed fashion. Likewise, components that are separately described may be executed in a combined fashion.

While one or more example embodiments have been described with reference to the figures, it will be understood by those of ordinary skill in the art that various changes in form and details may be made therein without departing from the spirit and scope as defined by the following claims.

What is claimed is:

1. An audio processing device comprising:
a first controller configured to initialize the audio processing device; and
a second controller configured to connect the audio processing device and an audio output device comprising audio output circuitry while the first controller initializes the audio processing device, and to transmit a message reporting completion of the connection of the audio processing device and the audio output device to the first controller,
wherein the first controller is configured to start an operation of outputting audio to the audio output device in response to the message reporting the completion of the connection from the second controller.

2. The audio processing device of claim 1, wherein the second controller is configured to transmit a message for turning on the audio output device and, when the audio output device is turned on in response to the message, to connect the audio processing device and the audio output device by determining a connection state of the audio processing device and the audio output device.

3. The audio processing device of claim 1, wherein the first controller is configured to control an audio output module comprising audio output circuitry to start outputting audio in response to the message reporting completion of the connection.

4. The audio processing device of claim 2, wherein the second controller is further configured to determine the connection state of the audio processing device and the audio output device by comparing a physical address of the audio output device and an audio return channel (ARC) port of the audio processing device to determine whether the physical address and the ARC port are identical.

5. The audio processing device of claim 4, wherein the second controller is further configured to receive physical address information of the audio output device from the audio output device and to compare the physical address of the audio output device and the ARC port of the audio processing device to determine, based on the physical address information, whether the physical address and the ARC port are identical.

6. The audio processing device of claim 5, wherein the second controller is further configured to store the received physical address information of the audio output device.

7. The audio processing device of claim 1, wherein the second controller is further configured to determine a previously stored connection state of an ARC port when the audio processing device is turned on, and to transmit a message for turning on the audio output device based on the previously stored connection state of the ARC port.

8. The audio processing device of claim 7, wherein the previously stored connection state of the ARC port comprises a finally stored connection state of the ARC port before the audio processing device was turned off.

9. The audio processing device of claim 1, wherein the first controller is further configured to control the second controller to store a state indicating whether the audio output device outputs an audio signal when the audio processing device is turned off.

10. An audio processing method comprising:
initializing, by a first controller, an audio processing device comprising audio circuitry;
connecting, by a second controller, the audio processing device and an audio output device while the first controller initializes the audio processing device, and transmitting, by the second controller, a message reporting completion of the connection of the audio processing device and the audio output device to the first controller; and
starting, by the first controller, outputting audio to the audio output device in response to the message reporting the completion of the connection.

11. The audio processing method of claim 10, wherein the connecting comprises:
transmitting, by the second controller, a message for turning on the audio output device; and
when the audio output device is turned on in response to the message, connecting, by the second controller, the audio processing device and the audio output device by determining a connection state of the audio processing device and the audio output device.

12. The audio processing method of claim 10, wherein the starting of the operation of outputting audio comprises controlling, by the first controller, an audio output module to start outputting audio in response to the message reporting the completion of the connection.

13. The audio processing method of claim 11, wherein the determining of the connection state comprises comparing a physical address of the audio output device and an ARC port of the audio processing device to determine whether the physical address and the ARC port are identical.

14. The audio processing method of claim 13, wherein the determining of the connection state further comprises:
receiving physical address information of the audio output device from the audio output device; and
comparing the physical address of the audio output device and the ARC port of the audio processing device to determine whether the physical address and the ARC port are identical based on the physical address information.

15. The audio processing method of claim 14, wherein the receiving comprises: storing the received physical address information of the audio output device.

16. The audio processing method of claim 10, further comprising:
determining, by the second controller, a previously stored connection state of an ARC port when the audio processing device is turned on; and
transmitting, by the second controller, a message for turning on the audio output device based on the previously stored connection state of the ARC port.

17. The audio processing method of claim 16, wherein the previously stored connection state of the ARC port comprises a finally stored connection state of the ARC port before the audio processing device was turned off.

18. The audio processing method of claim 10, further comprising: controlling, by the first controller, the second controller to store a state indicating whether the audio output device outputs an audio signal when audio processing device is turned off.

19. A non-transitory computer-readable recording medium having embodied thereon a computer program for executing the audio processing method of claim 10.

* * * * *